United States Patent
Fu et al.

(10) Patent No.: US 7,027,135 B2
(45) Date of Patent: Apr. 11, 2006

(54) OPTICAL CIRCUITS FOR TUNABLE SECOND ORDER PMD COMPENSATION AND TUNABLE DISPERSION COMPENSATION

(75) Inventors: Xiaoli Fu, Nepean (CA); Genzao Zhang, Ottawa (CA); Tongqing Wang, Los Altos, CA (US); Feng Shi, Kanata (CA)

(73) Assignee: Oplink Communications, Inc., Fremont, CA (US)

( * ) Notice: Subject to any disclaimer, the term of this patent is extended or adjusted under 35 U.S.C. 154(b) by 269 days.

(21) Appl. No.: 10/157,901

(22) Filed: May 31, 2002

(65) Prior Publication Data
US 2003/0223056 A1 Dec. 4, 2003

(51) Int. Cl.
*G01N 21/00* (2006.01)
(52) U.S. Cl. .................................... 356/73.1
(58) Field of Classification Search ............ 356/73.1; 385/11, 123, 127, 128
See application file for complete search history.

(56) References Cited

U.S. PATENT DOCUMENTS

| | | | |
|---|---|---|---|
| 6,104,515 A | 8/2000 | Cao | 359/161 |
| 6,259,845 B1 | 7/2001 | Sardesai | 385/123 |
| 6,271,952 B1 | 8/2001 | Epworth | 359/161 |
| 6,301,048 B1 | 10/2001 | Cao | 359/566 |
| 6,330,383 B1 | 12/2001 | Cai et al. | 385/37 |
| 6,385,356 B1 | 5/2002 | Jopson et al. | 385/11 |
| 6,707,977 B1 * | 3/2004 | Chien et al. | 385/128 |
| 2001/0028760 A1 * | 10/2001 | Yaffe | 385/27 |
| 2002/0015547 A1 | 2/2002 | Patel | 385/11 |
| 2002/0021854 A1 | 2/2002 | Bandemer et al. | 385/11 |
| 2002/0075477 A1 | 6/2002 | Yu et al. | 356/73.1 |
| 2002/0080467 A1 | 6/2002 | Damask | 359/301 |
| 2002/0118455 A1 | 8/2002 | Damask | 359/484 |
| 2002/0191285 A1 | 12/2002 | Damask et al. | 359/484 |

FOREIGN PATENT DOCUMENTS

| | | |
|---|---|---|
| EP | 1087245 | 9/2000 |
| WO | 0210811 | 7/2001 |

OTHER PUBLICATIONS

P. Ciprut, B. Gisin, N. Gisin, R. Passy, J.P. Von der Weid, F. Prieto, and C. W. Zimmer, "Second-Order Polarization Mode Dispersion: Impact on Analog and Digital Transmissions", Journal of Lightwave Technology, vol. 16, No. 5, May 1998, pp. 757-771.

(Continued)

*Primary Examiner*—Tu T. Nguyen
(74) *Attorney, Agent, or Firm*—Fish & Richardson P.C.

(57) ABSTRACT

A method and an apparatus is provided for introducing tunable second order polarization mode dispersion compensation to an optical signal without introducing any first order polarization mode dispersion into the optical signal. A method and an apparatus is also provided for tunable chromatic dispersion compensation by rotating the polarization state of an input signal to match the chromatic like second order PMD compensation provided by the present invention. In one configuration, birefringent elements are arranged into at least two stages, each stage having at least two birefringent elements, each birefringent element of one stage oriented orthogonal to a corresponding birefringent element of a corresponding stage. In another configuration, the polarization of optical signals emerging from each birefringent element are rotated to create effective orthogonal orientations between corresponding birefringent elements of corresponding stages.

25 Claims, 5 Drawing Sheets

OTHER PUBLICATIONS

Q. Yu, L.-S. Yan, Y. Xie, M. Hauer, and A.E. Willner, "Higher Order Polarization Mode Dispersion Compensation Using a Fixed Time Delay Followed by a Variable Time Delay", IEEE Photonics Technology Letters, vol. 13, No. 8, Aug. 2001, pp. 863-865.

Y. Li, A. Eyal, P.-O. Hedekvist, and A. Yariv, "Measurement of High-Order Polarization Mode Dispersion" IEEE Photonics Technology Letters, vol. 12, No. 7, Jul. 2000, pp. 861-863.

M. Shtaif, A. Mecozzi, M. Tur, and J.A. Nagel, "A Compensator for the Effects of High-Order Polarization Mode Dispersion in Optical Fibers", IEEE Photonics Technology Letters, vol. 12, No. 4, Apr. 2000, pp. 434-436.

N. Kikuchi, "Adaptive Chromatic Dispersion Compensation Using Higher Order Polarization-Mode Dispersion", IEEE Photonics Technology Letters, vol. 13, No. 10, Oct. 2001.

"Component for second-order compensation of polarisation-mode dispersion"; J. Patscher and R. Eckhardt; Electronics Letters; Jun. 19, 1997; vol. 33; No. 13; pp. 1157-1159.

"Polarization Mode Dispersion" Fred L. Heismann; Cleo 2000; Monday, May 8; pp. 58-59.

* cited by examiner

POLARIZATION VECTORS

OPTICAL CIRCUITS FOR TUNABLE SECOND ORDER PMD COMPENSATION AND TUNABLE DISPERSION COMPENSATION

FIELD OF THE INVENTION

The invention relates to methods and optical circuits for polarization mode dispersion (PMD) compensation of optical signals and more particularly to tunable second order polarization mode dispersion compensation.

BACKGROUND OF THE INVENTION

Polarization mode dispersion is one of the major types of dispersion which impairs the operation of fiber optical systems, especially systems with bit rates of 40 Gb/s or higher.

Polarization mode dispersion may be caused by many forms of imperfections along a fiber span. Asymmetry in the cylindrical form of the core or cladding, mechanical stress and other factors can cause polarization modes of the light passing through the fiber to propagate at different speeds depending upon their axes of alignment. This effect occurring at numerous different locations, orientations and magnitudes along a fiber span causes a spreading of optical pulses and a change in their shape.

Polarization mode dispersion is also wavelength dependent. A profile of PMD versus angular frequency $\omega$ reveals moreover that this relationship is not linear. As frequency changes, so does PMD, sometimes in a very non-trivial way. A functional form can be approximated near a particular carrier frequency $\omega_0$ by a functional expansion around $\omega_0$. In this way PMD is a combination of first order and higher order effects. First order PMD is a first order contribution based on the linear term, while second order PMD is based on the parabolic term in $\omega$. The delay between polarized energy associated with first order PMD is called the differential group delay (DGD) and is characteristic of the delay between principal polarization states of the first order PMD. Nonprincipal polarization states undergo a dispersion which varies linearly with $\omega$. Second order PMD is characterized by dispersion which All varies parabolically with $\omega$. In WDM optical systems involving more than one optical frequency, measuring higher order PMD and compensating for it is important to maintain high bit-rate, and network operability.

The standard way to describe PMD is to express it as a three dimensional vector in Stokes Space. Each vector in Stokes Space represents a single unique polarization state. Every possible polarization state may be represented by a single vector in Stokes space the components of which are S1, S2, and S3, corresponding respectively to the amount of horizontal polarization, the amount of linear polarization at a 45 degree angle, and the amount of left-handed circular polarization. The convention for the sign or direction of the PMD vector is that it points in the direction corresponding to the polarization states in which the dispersion is positive. This convention is chosen for both the PMD of optical signals and for the PMD of compensation modules, although any convention which is consistent would suffice.

Tunable dispersion compensation is one of the key requirements for high bit rate fiber optical systems, especially for systems with bit rates of 40 Gb/s or higher. In modern optical communications systems, in addition to first order PMD compensation, sometimes second order PMD compensation is also needed. Currently compensators provide first order PMD compensation, or a combination of first and higher order PMD compensation. For a more detailed discussion regarding second order PMD and the need for its compensation, please refer to P. Ciprut, B. Gisin, N. Gisin, R. Passy, et al, "Second-order Polarization Mode Dispersion: Impact on Analog and Digital Transmissions," IEEE J. Lightwave Technology, Vol.16(5), pp.757, 1998; Q- Yu, L. -S. Yan, Y. Xie, M. Hauer, A. E. Willner, "Higher Order Polarization Mode Dispersion Compensation Using a Fixed Time Delay Followed by a Variable Time Delay," IEEE Photonics Technology Letters, Vol.13(8), pp.863, 2001.

A compensator which provides only second order PMD compensation with zero first order PMD compensation is desirable if, for example, first order polarization mode dispersion is already employed and an optical signal needs only second order polarization mode dispersion compensation. As such a second order PMD compensator enables the system to be separately optimized on both the first order PMD compensation and the second order PMD compensation. In order for the system to be separately optimized as described above, the second order PMD compensator should not change the first order polarization mode dispersion of the optical signals.

SUMMARY OF THE INVENTION

The present invention provides a method and an apparatus for introducing tunable second order polarization mode dispersion compensation to an optical signal without introducing any first order polarization mode dispersion into the optical signal. The present invention also provides a method and an apparatus for tunable chromatic dispersion compensation by rotating the polarization state of an input signal to match the chromatic like second order PMD compensation provided by the present invention In one configuration, birefringent elements are arranged into at least two stages, each stage having at least two birefringent elements, each birefringent element of one stage oriented orthogonal to a corresponding birefringent element of a corresponding stage. In another configuration, the polarization of optical signals emerging from each birefringent element are rotated to create effective orthogonal orientations between corresponding birefringent elements of corresponding stages.

According to a first broad aspect, the invention provides for a method of providing dispersion compensation to an optical signal having a direction of propagation, the method including in order, passing the optical signal through a first birefringent element having a fast axis and a slow axis in a normal plane oriented normal to the direction of propagation, the first fast oriented in a first direction in the normal plane, passing the optical signal through a second birefringent element having a second fast axis oriented in a second direction in the normal plane, the second direction being at a nonzero angle $\theta$ from the first direction, passing the optical signal through a third birefringent element having a third fast axis oriented in a third direction in the normal plane, the third direction being orthogonal to the first direction, and passing the optical signal through a fourth birefringent element having a fourth fast axis oriented in a fourth direction in the normal plane, the fourth direction being orthogonal to the second direction.

In some embodiments of the invention the first, second, third, and fourth birefringent elements are wave-plates. In some embodiments of the invention the first, second, third, and fourth birefringent elements are birefringent fibers.

According to a second broad aspect, the invention provides for an apparatus for providing dispersion compensation to an optical signal having a direction of propagation, the apparatus including, a first birefringent element having a fast axis and a slow axis in a normal plane oriented normal to the direction of propagation, the fast axis oriented in a first direction in the normal plane, a second birefringent element having a second fast axis oriented in a second direction in the normal plane, the second direction being at a nonzero angle $\theta$ from the first direction, a third birefringent element having a third fast axis oriented in a third direction in the normal plane, the third direction being orthogonal to the first direction, and a fourth birefringent element having a fourth fast axis oriented in a fourth direction in the normal plane, the fourth direction being orthogonal to the second direction, in which the first, second, third, and fourth birefringent elements are arranged for the passing of the optical signal through, in order, the first birefringent element, the second birefringent element, the third birefringent element, and the fourth birefringent element.

Some embodiments of the invention provide for a polarization controller for controlling the polarization of the optical signal before it passes through the first birefringent element, such that a second order PMD Stokes vector of the optical signal is opposite to the direction of the Stokes vector of second order PMD caused by the first, second, third, and fourth birefringent elements, by which second order PMD compensation is provided to the optical signal and an insignificant amount of first order PMD compensation is provided to the optical signal.

Some embodiments of the invention provide for a polarization controller for controlling the polarization of the optical signal before it passes through the first birefringent element, such that the principal polarization state Stokes vector of the optical signal is opposite to the direction of the Stokes vector of second order PMD caused by the first, second, third, and fourth birefringent elements, by which chromatic dispersion compensation is provided to the optical signal and an insignificant amount of first order PMD compensation is provided to the optical signal.

Some embodiments of the invention provide for a birefringent element controller for controlling the nonzero angle $\theta$ through mechanical rotation of the first and third birefringent elements, by which the magnitude of the second order PMD compensation is controlled. Some embodiments of the invention provide for a birefringent element controller for controlling the nonzero angle $\theta$ through mechanical rotation of the second and fourth birefringent elements, by which the magnitude of the second order PMD compensation is controlled.

Some embodiments of the invention provide for a birefringent element controller for controlling the nonzero angle $\theta$ through mechanical rotation of the first and third birefringent elements, by which the magnitude of the second order PMD compensation is controlled. Some embodiments of the invention provide for a birefringent element controller for controlling the nonzero angle $\theta$ through mechanical rotation of the second and fourth birefringent elements, by which the magnitude of the second order PMD compensation is controlled.

Some embodiments of the invention provide for a birefringent element controller for controlling the nonzero angle $\theta$ through mechanical rotation of the first and third birefringent elements, by which the magnitude of the chromatic dispersion compensation is controlled. Some embodiments of the invention provide for a birefringent element controller for controlling the nonzero angle $\theta$ through mechanical rotation of the second and fourth birefringent elements, by which the magnitude of the chromatic dispersion compensation is controlled.

Some embodiments of the invention provide for an optical signal analyzer for analyzing the optical signal after it has passed through the fourth birefringent element producing an analysis of the optical signal, in which the polarization controller controls the polarization of the optical signal and the birefringent element controller controls the nonzero angle $\theta$ as a function of the analysis of the optical signal.

According to a third broad aspect, the invention provides for a method of providing dispersion compensation to an optical signal having a direction of propagation, the method including in order, passing the optical signal through a first birefringent element having a fast axis and a slow axis in a normal plane oriented normal to the direction of propagation, the fast axis oriented in a first direction in the normal plane, rotating polarization states of the optical signal by an amount equal to $-\theta+\phi_2$, where $\theta$ is a first nonzero angle, and $\phi_2$ is a second angle, passing the optical signal through a second birefringent element having a second fast axis oriented in a second direction in the normal plane, the second direction making an angle with the first direction equal to the second angle $\phi_2$, rotating the polarization states of the optical signal by an amount equal to $\theta-\phi_2-90°+\phi_3$, where $\phi_3$ is a third angle, passing the optical signal through a third birefringent element having a third fast axis oriented in a third direction in the normal plane, the third direction making an angle with the first direction equal to the third angle $\phi_3$, rotating polarization states of the optical signal by an amount equal to $-\theta+(\phi_4-\phi_3)$, where $\phi_4$ is a fourth angle, and passing the optical signal through a fourth birefringent element having a fourth fast axis oriented in a fourth direction in the normal plane, the fourth direction making an angle with the first direction equal to the fourth angle $\phi_4$.

In some embodiments of the invention, the second angle $\phi_2$ is zero, the third angle $\phi_3$ is zero and the fourth angle $\phi_4$ is zero. In some embodiments of the invention, the second angle $\phi_2$ is zero, the third angle $\phi_3$ is 90° and the fourth angle $\phi_4$ is 90°.

According to a fourth broad aspect, the invention provides for an apparatus for providing dispersion compensation to an optical signal having a direction of propagation, the apparatus including, a first birefringent element having a fast axis and a slow axis in a normal plane oriented normal to the direction of propagation, the fast axis oriented in a first direction in the normal plane, a first polarization rotator for rotating polarization states of the optical signal by an amount equal to $-\theta+\phi_2$, where $\theta$ is a first nonzero angle, and $\phi_2$ is a second angle, a second birefringent element having a second fast axis oriented in a second direction in the normal plane, the second direction making an angle with the first direction equal to the second angle $\phi_2$, a second polarization rotator for rotating the polarization states of the optical signal by an amount equal to $\theta-\phi_2-90°+\phi_3$, where $\phi_3$ is a third angle, a third birefringent element having a third fast axis oriented in a third direction in the normal plane, the third direction making an angle with the first direction equal to the third angle $\phi_3$, a third polarization rotator for rotating polarization states of the optical signal by an amount equal to $-\theta+(\phi_4-\phi_3)$ where $\phi_4$ is a fourth angle, and a fourth birefringent element having a fourth fast axis oriented in a fourth direction in the normal plane, the fourth direction making an angle with the first direction equal to the fourth angle $\phi_4$, in which the first birefringent element, the first polarization rotator, the second birefringent element, the second polarization rotator, the third birefringent element, the third polarization rotator, and the fourth birefringent element are arranged for the passing of the optical signal through, in order, the first birefringent element, the first polarization rotator, the second birefringent element, the second polarization rotator, the third birefringent element, the third polarization rotator, and the fourth birefringent element.

Some embodiments of the invention provide for a polarization rotator controller for controlling the rotating of polarization states by the first polarization rotator, the second polarization rotator, and the third polarization rotator, to control the first nonzero angle θ, by which the magnitude of the second order PMD dispersion compensation is controlled. Some embodiments of the invention provide for a polarization rotator controller for controlling the rotating of polarization states by the first polarization rotator, the second polarization rotator, and the third polarization rotator, to control the first nonzero angle θ, by which the magnitude of the chromatic dispersion is controlled.

Some embodiments of the invention provide for an optical signal analyzer for analyzing the optical signal after it has passed through the fourth birefringent element producing an analysis of the optical signal, in which the polarization controller controls the polarization of the optical signal and the polarization rotator controller controls the rotating of polarization states by the first polarization rotator, the second polarization rotator, and the third polarization rotator, as a function of the analysis of the optical signal.

According to a fifth broad aspect, the invention provides for a method of providing second order PMD compensation to an optical signal, the method including passing the optical signal through a tunable second order PMD block, analyzing the optical signal after it has passed through the tunable second order PMD block producing an analysis of the optical signal, controlling the polarization of the optical signal as a function of the analysis of the optical signal such that a second order PMD Stokes vector of the optical signal is opposite to the direction of the Stokes vector of second order PMD caused by the tunable second order PMD block, and controlling the magnitude of the second order PMD caused by the tunable second order PMD block as a function of the analysis of the optical signal, by which second order PMD compensation is provided to the optical signal and an insignificant amount of first order PMD compensation is provided to the optical signal.

According to a sixth broad aspect, the invention provides for a method of providing chromatic dispersion compensation to an optical signal, the method including passing the optical signal through a tunable second order PMD block, analyzing the optical signal after it has passed through the tunable second order PMD block producing an analysis of the optical signal, controlling the polarization of the optical signal as a function of the analysis of the optical signal such that the principal polarization state Stokes vector of the optical signal is opposite to the direction of the Stokes vector of second order PMD caused by the tunable second order PMD block, and controlling the magnitude of the second order PMD caused by the tunable second order PMD block as a function of the analysis of the optical signal, by which chromatic dispersion compensation is provided to the optical signal and an insignificant amount of first order PMD compensation is provided to the optical signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Figure 1:
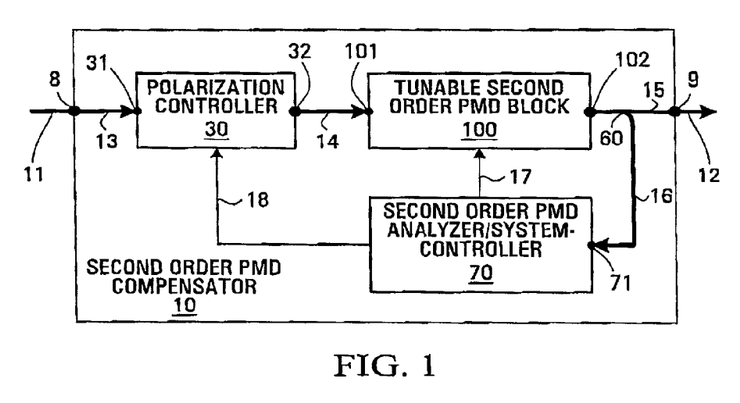
FIG. 1 is a block diagram of a preferred tunable second order PMD compensator constructed according to the invention.

Referring to FIG. 1, a preferred configuration for a tunable second order PMD compensator employing a tunable second order PMD block constructed according to the invention is described.

The second order PMD compensator 10 has an optical input 8 connected to an input fiber 11. The optical input 8 is connected via an optical waveguide portion 13 to an input 31 of a polarization controller 30. The polarization controller 30 has an output 32 which is connected via an optical waveguide portion 14 to an input 101 of a tunable second order PMD block 100. The tunable second order PMD block 100 has an output 102 which is connected via an optical waveguide portion 15 to an output 9 of the second order PMD compensator 10. The output 9 of the second order PMD compensator 10 is connected to an output fiber 12. A waveguide power tap 60 is coupled along waveguide portion 15. The waveguide power tap 60 is connected via an optical waveguide portion 16 to an input 71 of a second order PMD analyzer/system-controller 70. The second order PMD analyzer/system-controller 70 is coupled along PMD block control line(s) 17 to the tunable second order PMD block 100 and is coupled along polarization controller control line(s) 18 to the polarization controller 30.

In terms of function, an input optical signal traversing the input fiber 11 enters the input 8 of the second order PMD compensator 10. The signal traverses the optical waveguide portion 13 and enters the input 31 of the polarization controller 30. The polarization controller 30, controlled by the second order PMD analyzer/system-controller 70 via the polarization controller control line(s) 18, controls the polarization states of the incoming optical signals for proper second order polarization mode dispersion compensation. Specifically the polarization controller 30 rotates the Stokes vector of the second order polarization mode dispersion of the input signal to match a direction opposite from the second order polarization mode dispersion of the tunable second order PMD block 100. The optical signal emerges from the output 32 of the polarization controller 30 and traverses the optical waveguide portion 14 to the input 101 of the tunable second order PMD block 100. The tunable second order PMD block 100 (explained in more detail below) presents a zero first order polarization mode dispersion but a variable second order polarization mode dispersion (at a given direction) to the optical signal. Since the polarization controller 30 rotated the second order polarization mode dispersion of the input optical signal to be opposite with respect to the second order polarization mode dispersion of the tunable second order PMD block 100, the second order polarization mode dispersion of the optical signal is compensated. A compensated optical signal emerges from the output 102 of the tunable second order PMD block 100 onto the optical waveguide portion 15. Part of the compensated optical signal is tapped by the waveguide power tap 60, and traverses the waveguide portion 16 to the input 71 of the second order PMD analyzer/system controller 70. Part of the compensated optical signal continues along optical waveguide portion 15 to emerge from the output 9 of the second order PMD compensator 10 onto the output fiber 12. The optical signal input through the input 71 of the second order PMD analyzer/system controller 70 is used to determine if the polarization controller 30, or the tunable second order PMD block 100 needs to be controlled or varied in order to effect proper second order polarization mode dispersion compensation. Specifically, the direction of the second order polarization mode dispersion Stokes vector is varied by the polarization controller 30 via control signals sent by the second order PMD analyzer/system controller 70 over polarization controller control line(s) 18, to rotate the Stokes vector to be in the opposite direction in Stokes space to the second order polarization mode dispersion Stokes vector of the tunable second order PMD block 100. The amount of the second order polarization mode dispersion of the tunable second order PMD block 100 is controlled via control signals sent by the second order PMD analyzer/system controller 70 over PMD block control line(s) 17. As is described below, the control signals serve to cause a rotation of optical elements or the optical signals themselves inside the tunable second order PMD block 100, to effect the proper magnitude of second order polarization mode dispersion so that second order polarization mode dispersion compensation of a desired magnitude results.

Figure 2:
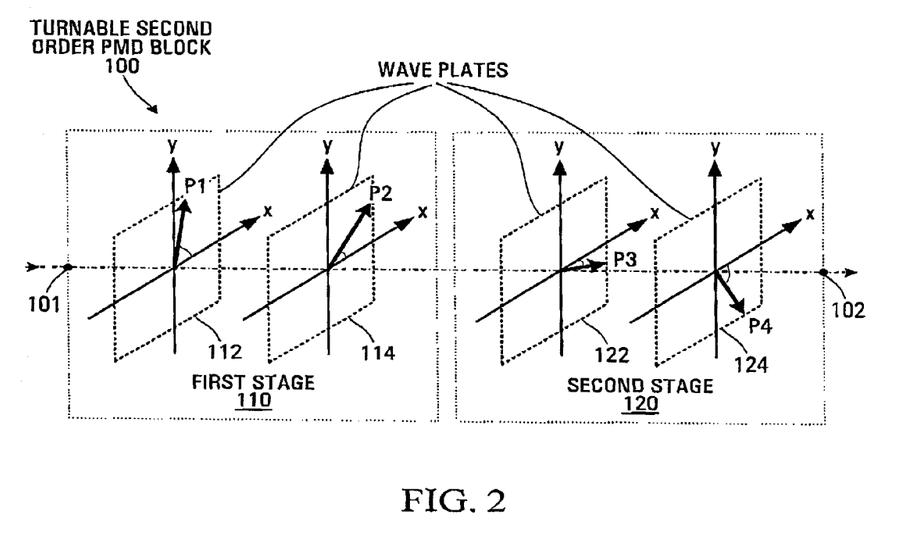
FIG. 2 is a conceptual illustration of a preferred tunable second order PMD block of FIG. 1, constructed according to the invention.
Figure 3:
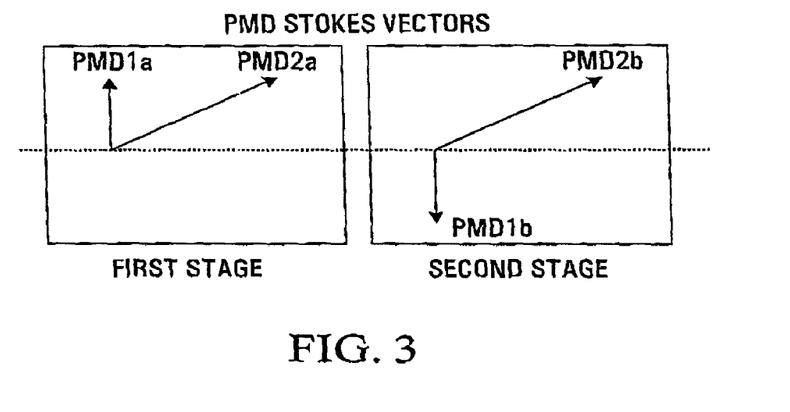
FIG. 3 is a conceptual vector diagram of the PMD Stokes vectors of the stages of the tunable second order PMD block of FIG. 2.

Referring also to FIG. 2, and FIG. 3, the tunable second order PMD block 100 of a preferred embodiment is described. The tunable second order PMD block 100 has two stages; a first stage 110 and a second stage 120. Each stage 110, 120 has two wave-plates, the first stage 110 having a first wave-plate 112, and a second wave-plate 114, and the second stage 120 having a third wave-plate 122 and a fourth wave-plate 124. The wave-plates of the preferred embodiment are calcite crystal wave-plates having a differential group delay (DGD) of about 10 ps although other DGD values are equally applicable, and the wave plates need not be half-wave plates. The differential group delay for a wave-plate which conveniently has a well defined fast axis and a slow axis perpendicular to the fast axis, is the group delay difference between the components of the transmitted optical signal polarized along the fast axis and the components of the transmitted optical signal polarized along the slow axis. An important preference is that all of the wave-plates have substantially equal DGDs and are preferably nearly identical. Each of the wave-plates has a fast axis and a slow axis both of which lies in the plane of the wave-plate, all wave-plates oriented normal to the path of optical signals between the input 101 and the output 102. Referring to FIG. 2, the fast axis of the first 112, second 114, third 122, and fourth 124 wave-plates are respectively P1, P2, P3, and P4. The fast axis P1 of the first wave-plate 112 is arranged to be 90 degrees from the fast axis P3 of the third wave-plate 122. The fast axis P2 of the second wave-plate 114 is arranged to be 90 degrees from the fast axis P4 of the fourth wave-plate 124. This perpendicular arrangement between the fast axes of respectively the first 112 and third 122, and the second 114 and fourth 124 wave-plates is to exhibit an insignificant first order polarization mode dispersion over the stages 110 and 120 of the tunable second order PMD block 100. The tunable second order PMD block 100 exhibiting an insignificant first order polarization mode dispersion results in the tunable second order PMD block 100 compensating an insignificant amount of first order polarization mode dispersion. This results in the first order polarization mode dispersion of the optical signal being essentially unchanged. Since the first 112 and third 122 wave-plates are perpendicular, as are the second 114 and fourth 124 wave-plates, the angle between the first 112 and second 114 wave-plate is the same as the angle between the third 122 and fourth 124 wave-plate. The magnitude of the angle between the plates of each stage, and the magnitude of the DGD of the plates controls the amount of second order polarization mode dispersion of the tunable second order PMD block 100, and hence the amount of possible compensation for second order polarization mode dispersion in the optical signals. The two stages each have an equal amount of second order polarization mode dispersion which contributes to the total second order polarization mode dispersion of the tunable second order PMD block 100. As described above, the second order polarization mode dispersion of the tunable second order PMD block 100 is set to the same magnitude as the second order polarization mode dispersion to be compensated. The incoming second order polarization mode dispersion polarization state of the optical signal is set by the polarization controller so that its vector in Stokes space is in a direction opposite to the second order PMD vector in Stokes space of the tunable second order PMD block 100.

Referring to FIG. 3, a conceptual vector diagram of polarization vectors in Stokes space for each of the stages is discussed In the conceptual representation of the polarization vectors of Stokes space, PMD1*a* is the first order polarization mode dispersion polarization vector of the first stage, whereas PMD2*a* is the second order polarization mode dispersion polarization vector of the first stage. For the second stage, PMD1*b* is the first order polarization mode dispersion polarization vector, whereas PMD2*b* is the second order polarization mode dispersion polarization vector. As can be seen in the diagram, the first order polarization mode dispersion polarization vectors in Stokes space PMD1*a*, PMD1*b* are opposite and equal in magnitude, due to the orthogonality of respectively the first 112 and third 122, and the second 114 and fourth 124 wave-plates. The total first order polarization mode dispersion of the tunable second order PMD block 100 is the sum of the first order polarization mode dispersion vectors in Stokes space PMD1a, PMD1b which is substantially zero or an insignificant amount. As also can be seen in the diagram, the second order polarization mode dispersion polarization vectors in Stokes space PMD2a, PMD2b are directed in the same direction and are equal in magnitude, due to the equality of angles between respectively the first 112 and second 114, and the third 122 and fourth 124 wave-plates. The total second order polarization mode dispersion of the tunable second order PMD block 100 is the sum of the second order polarization mode dispersion vectors in Stokes space PMD2a, PMD2b.

The actual amount of second order polarization mode dispersion of the tunable second order PMD block 100 is determined generally by two factors. The first factor is the angle between two fast axes of each stage, i.e., the angle θ between P1 and P2 which is the same angle as that between P3 and P4. For the purposes of the following calculation, θ is the angle P1 makes with the x-axis (as shown) minus the angle P2 makes with the x-axis. The second factor is the group delay difference between the components of the light traveling along the fast and slow axes of each wave-plate, i.e., the DGD (differential group delay) which is the same for all the four wave-plates. According to Y. Li, A. Eyal, P. -O. Hedekvist, A. Yariv, "Measurement of High-Order Polarization Mode Dispersion," IEEE Photonics Technology Letters, Vol.12(7), July 2000, the first and second order polarization mode dispersion may be calculated by an exponential expansion of the Jones Matrix around a carrier frequency $\omega_0$. Assume the Jones matrix M of the tunable second order PMD block 100 is;

$$M = M_1 \cdot M_2 \cdot M_3 \cdot M_4$$

where $M_1$ is the Jones matrix of the first wave-plate, $M_2$ is the Tones matrix of the second wave-plate, $M_3$ is the Jones matrix of the third wave-plate, and $M_4$ is the Jones matrix of the fourth wave-plate. The first order characteristic matrix of the PMD in the expansion of M is:

$$N_1 = \text{Diff1}(M) \cdot \text{inv}(M)$$

where Diff1(M) is the first order derivative of M about $\omega_0$ with respect to angular frequency ω, and inv(M) is the inverse of M at $\omega_0$. The second order characteristic matrix of the PMD in the expansion of is:

$$N_2 = \text{Diff2}(M) \cdot \text{inv}(M) - N_1^2$$

where Diff2(M) is the second order derivative of M about $\omega_0$ with respect to angular frequency ω.

An eigen-analysis of $N_1$ produces two eigenvalues, a1 and a2, corresponding to eigenvectors va1 and va2. Suppose Im(a1)<Im(a2), then as a convention, the magnitude of the first order PMD is Im(a2−a1) while its direction is along va1.

An eigen-analysis of $N_2$ produces two eigenvalues, b1 and b2, corresponding to eigenvectors vb1 and vb2. Suppose Im(b1)<Im(b2), then as a convention, the magnitude of the second order PMD is Im(b2−b1) while its direction is along vb1. This is a convention which is consistent with positive PMD occurring along vb1. It should be noted that a negative dispersion of the same amount occurs along vb2.

This calculation is a not trivial, but the result is a zero first order PMD, and a second order PMD with a magnitude of:

$$2DGD^2 \sin(2\theta) ps^2$$

at a direction in Stokes space of:

$$[1, -i]$$

which is left-circularly polarized. The negative second order PMD of the same magnitude at a direction in Stokes space which is right-circularly polarized occurs at a direction in Stokes space of [1, i]. Here DGD is the DGD of each wave-plate, and θ is assumed to be between 0 and 45 degrees. The magnitude of the second order PMD is in units of $ps^2$. If the unit of ps/nm is preferred, the second order PMD magnitude expression can be transformed as 1.6 $DGD^2 \sin(2\theta)$ ps/nm at 1550 nm. It should be noted that if θ is negative, the positive second order PMD is in a direction of [1, i] which is right-circularly polarized, the negative second order PMD of the same magnitude at a direction in Stokes space of [1, −i] which is left-circularly polarized.

Figure 4:
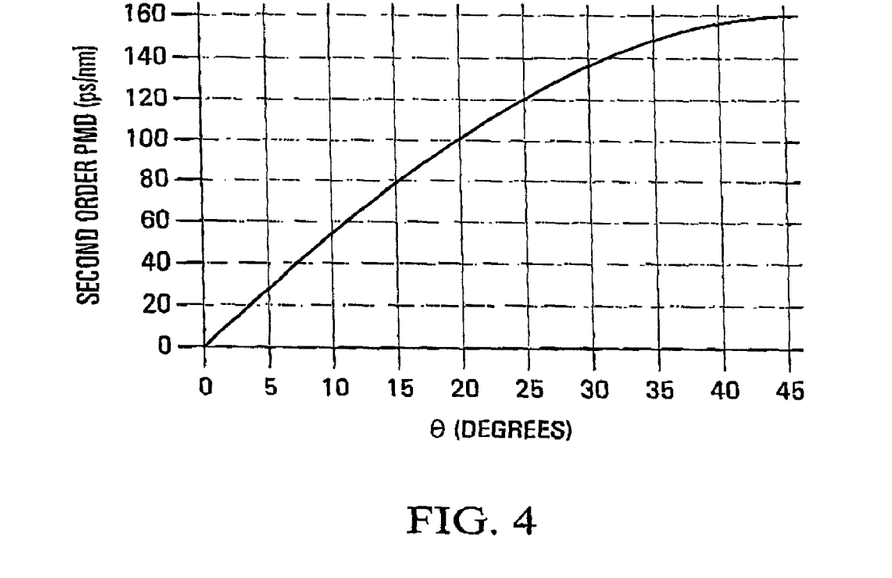
FIG. 4 is a graph of second order PMD versus angle θ for the tunable second order PMD block of FIG. 2.

Referring to FIG. 4, the magnitude of the resulting second order PMD as a function of θ is shown. Assuming the DGD is 10 ps, as can be seen from the graph, the second order polarization mode dispersion varies as a sinusoid from 0 ps/nm at 0 degrees to 160 ps/nm at 45 degrees. The angle of 45 degrees for θ produces a maximum second order polarization mode dispersion of the tunable second order PMD block 100.

Figure 5:
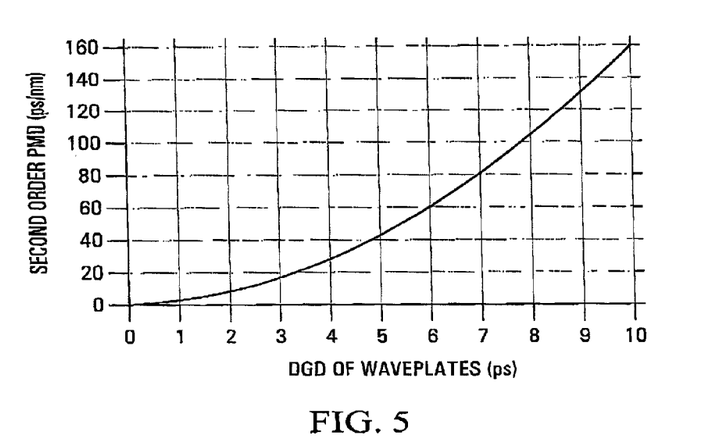
FIG. 5 is a graph of second order PMD versus DGD of the wave-plates of the tunable second order PMD block of FIG. 2.

Referring to FIG. 5, the resulting second order PMD as a function of DGD of the wave-plates of the tunable second order PMD block is shown. Assuming that θ is 45 degrees, as can be seen from the graph, the second order polarization mode dispersion varies parabolically from 0 ps/nm for 0 ps DGD to 160 ps/nm for 10 ps DGD. The higher the DGD the more second order polarization mode dispersion produced, and hence compensated for.

Figure 6:
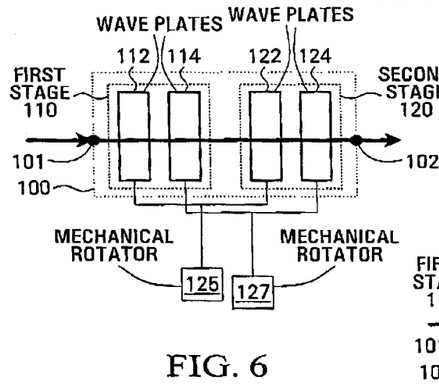
FIG. 6 is a block diagram of a preferred mechanically tunable embodiment of the second order PMD block of FIG. 2.

Referring now to FIG. 6, a preferred mechanically tunable embodiment of the tunable second order PMD block 100 which uses mechanical rotations of the wave-plates to tune the second order polarization mode dispersion is described. Similarly numbered elements in the figures correspond to similar elements. Each of the first and third wave-plates are rotated together mechanically by mechanical rotator 125. Each of the second and fourth wave-plates are rotated together mechanically by mechanical rotator 127. Each wave-plate is rotated about an axis normal to the plane in which it sits. The amount of rotation varies the angle θ for varying the magnitude of second order polarization mode dispersion. It is in this way that the tunable second order PMD block 100 is tunable. For the purposes of the preferred embodiment, one set of either the first and third wave-plates or conversely the second and fourth wave-plates may be fixed while the remaining plates are rotatable by a mechanical rotator.

Figure 7:
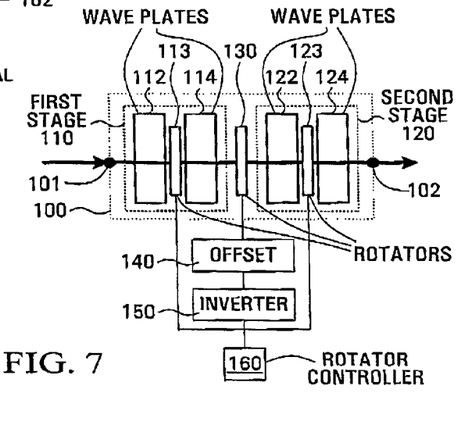
FIG. 7 is a block diagram of a preferred optically tunable second order PMD block of FIG. 2.

Referring now to FIG. 7, a preferred optically tunable embodiment which uses polarization control to rotate the polarization states of the optical signal is described. Instead of mechanically rotating the wave-plates themselves, this preferred embodiment rotates all of the polarization states of the optical signal passing therethrough by appropriate angles to achieve a physically equivalent angular relationship between wave-plates as indicated in FIGS. 2 and 6. Preferably the fast axes of the wave-plates of the first stage are aligned, and the fast axes of the wave-plates of the second stage are aligned. A first voltage controlled polarization rotator 113 rotates the polarization states of the optical signal transmitted by the first wave-plate 112 by an angle −θ, and a second polarization rotator 123 rotates the polarization states of the optical signal transmitted by the third wave-plate 122 by an angle −θ. These rotations of the polarization states of optical signals at a point between respectively the first and second wave-plates, and the third and fourth wave-plates, is physically equivalent to there being a relative physical difference in orientation of the wave-plates by an angle θ. Rotating the optical signal back by θ is equivalent to rotating the respective subsequent wave-plates forward by θ. A polarization rotator controller 160 is conceptually shown controlling both the first and the second polarization rotator using the same output voltage, ensuring that each rotator is set to rotate states by the same angle −θ. In order to maintain a proper orientation relationship between the wave-plates of the first stage with the wave-plates of the second stage, a third polarization rotator 130 rotates the polarization states of the optical signal transmitted by the second wave-plate 114. Assuming that the fast axes of the wave-plates of the first stage are aligned also with the fast axes of the wave-plates of the second stage, the third rotator should be set to rotate states by an angle of (θ−90°). One can interpret this as rotating the optical signal forward by θ to complete the physically equivalent operation of rotating the second wave-plate 114, plus a rotation of −90° which is physically equivalent to having the second stage oriented at +90° with respect to the first stage. An inverter 150 and an offset 140 are conceptually shown to indicate how the voltage of the polarization rotator controller 160 is varied to control the third polarization rotator 130. The inverter 150 inverts the voltage for a rotation of θ from the voltage for the rotation of −θ, and the offset 140 generates the voltage for a rotation of −90°. If, however, the fast axes of the wave-plates of the second stage were oriented at +90° with respect to the wave-plates of the first stage, then the third rotator would only be set to rotate polarization states by θ, and the offset 140 would not be needed. In the general case, if the fast axes of second, third and fourth wave-plates are respectively $\phi_2$, $\phi_3$, and $\phi_4$, in relation to the fast axis of the first wave-plate, then in order to create an effective angle θ between the wave-plates of each stage, and an effective angle of +90° between the first and the second stages, then the following rotations of the polarization states would be required. Rotator 113 should be set to cause a rotation of polarization states of $-\theta+\phi_2$. Rotator 130 should be set to cause a rotation of polarization states of $\theta-\phi_2-90°+\phi_3$. Rotator 123 should be set to cause a rotation of polarization states of $-\theta+(\phi_4-\phi_3)$. It should be noted that in the general case, as long as the rotators 113, 130 and 123 are set to cause rotations as outlined above, each of angles $\phi_2$, $\phi_3$, and $\phi_4$ could be any angle. In fact, angles $\phi_2$, $\phi_3$, and $\phi_4$ could be such that rotators 113, 130, and 123 should be set to rotate polarization states by 0° which would be the case for example if $\phi_2$ were equal to θ, if $\phi_3$ were equal to 90°, and if $\phi_4$ were equal to θ+90°.

In this embodiment preferably the offset 140, inverter 150, and conceptual identity of the rotation applied by rotator 113, and rotator 123 of FIG. 7 will be dispensed with in favor of a separate control for each of the rotators 113, 130, and 123.

It should be noted that in order for the embodiment of FIG. 7 to behave equivalently to that of FIGS. 2 and 6, the polarization rotators 113, 130, and 123, must be true rotators in the sense that they must rotate all incoming polarization states by the same amount. Examples of true rotators are liquid crystal polarization rotators and lithium niobate polarization rotators. An example of a non-true rotator is a half-wave plate which "reflects" the polarization state vector about the fast axis of the half-wave plate. Clearly the optical signal emerging from the first wave-plate 112 has more than one principle state of polarization. These different states would undergo a different "rotation" by a reflection about the fast axis of the half-wave plate. This difference in "rotation" between different polarization states in general is not desired in rotators 113, 130, and 123.

It should be noted that although polarization rotators have been described as controlled by voltage, any form of control appropriate to the particular polarization rotator may be used. It also should be noted that although FIG. 7 depicts conceptual representations of the same voltage controlling rotators 113, and 123, and also has specific reference to an inverter 150, and an offset 140, any form of appropriate control to ensure the amount of polarization state rotation by polarization rotators 113 and 123 is the same, and to ensure that the amount of polarization state rotation by polarization rotator 130 is either (θ−90°) or −90° as described above may be used.

It also should be noted that although the embodiments of FIG. 6 and FIG. 7 depict the use of either mechanical or optical rotation, some embodiments may combine a mechanical rotation of the wave-plates with an optical rotation of the polarization states of the optical signal.

Figure 8:
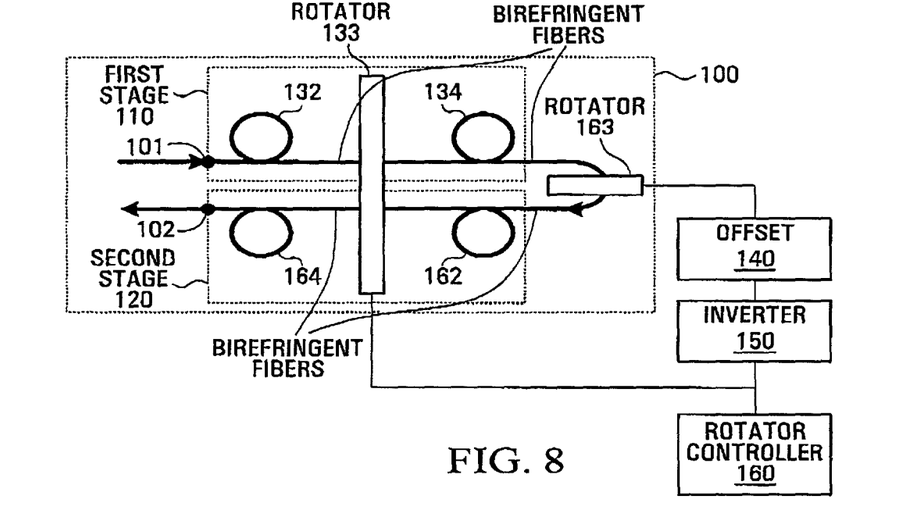
FIG. 8 is a block diagram of an alternative optically tunable second order PMD block constructed according to the invention utilizing birefringent fibers.

In FIG. 8, a tunable second order dispersion block 100 functions based on the same principles as the embodiment discussed in association with FIG. 7. Instead of using wave-plates, however, high birefringence fibers are used. The first stage 110 is made up of two identical high birefringence fibers, a first birefringent fiber 132, and a second birefringent fiber 134, each with a DGD of 10 ps. Between the first and second birefringent fibers 132, and 134 is a first portion of a first voltage controlled polarization rotator 133. The first polarization rotator 133 is a true rotator as in the sense discussed in respect of the rotators of the embodiment discussed in association with FIG. 7. The second stage 120 is made up of two identical high birefringence fibers, a third birefringent fiber 162, and a fourth birefringent fiber 164, each with a DGD of 10 ps. Between the third and fourth birefringent fibers 162, and 164 is a second portion of the first polarization rotator 133. Between the first and second stages 110, 120, is a second voltage controlled polarization rotator 163. The second polarization rotator 163 is a true rotator as in the sense discussed in respect of the rotators of the embodiment discussed in association with FIG. 7. Preferably the fast axes of the birefringent fibers of the first stage 132, 134 are aligned, and the fast axes of the birefringent fibers of the second stage 162, 164 are aligned. The first portion of the first voltage controlled polarization rotator 133 rotates the polarization states of the optical signal transmitted by the first birefringent fiber 132 by an angle −θ, and the second portion of the fist polarization rotator 133 rotates the polarization states of the optical signal transmitted by the third birefringent fiber 162 by an angle −θ. These rotations of the polarization states of optical signals at a point between respectively the first and second birefringent fibers, and the third and fourth birefringent fibers, is physically equivalent to there being a relative physical difference in orientation of the birefringent fibers by an angle θ. Rotating the optical signal back by θ is equivalent to rotating the respective following birefringent fibers forward by θ. A polarization rotator controller 160 is conceptually shown controlling the first polarization rotator 133. Since different portions of the same rotator 133 are used in each stage, it is ensured that the rotator is set to rotate states of the first and second stages by the same angle −θ. In order to maintain a proper orientation relationship between the birefringent fibers of the first stage with the birefringent fibers of the second stage, a third polarization rotator 163 rotates the polarization states of the optical signal transmitted by the second birefringent fiber 134. Assuming that the fast axes of the birefringent fibers of the first stage are aligned also with the fast axes of the birefringent fibers of the second stage, the second rotator should be set to rotate states by an angle of (θ−90°). One can interpret this as rotating the optical signal forward by θ to complete the physically equivalent operation of rotating the second birefringent fiber 134, plus a rotation of −90° which is physically equivalent to having the second stage oriented at +90° with respect to the first stage. An inverter 150 and an offset 140 are conceptually shown to indicate how the voltage of the polarization rotator controller 160 is varied to control the second polarization rotator 163. The inverter 150 inverts the voltage for a rotation of θ from the voltage for the rotation of −θ, and the offset 140 generates the voltage for a rotation of −90°. If, however, the fast axes of the birefringent fibers of the second stage were oriented at +90° with respect to the birefringent fibers of the first stage, then the second rotator would only be set to rotate polarization states by θ, and the offset 140 would not be needed. In the general case, if the fast axes of second 134, third 162 and fourth 164 birefringent fibers are respectively at angles $\phi_2$, $\phi_3$, and $\phi_4$, in relation to the fast axis of the first birefringent fiber 132, then in order to create an effective angle θ between the birefringent fibers of each stage, and an effective angle of +90° between the first and the second stages, then the following rotations of the polarization states would be required. Rotator 133 should be set to cause a rotation of polarization states of $-\theta+\phi_2$. Rotator 163 should be set to cause a rotation of polarization states of $\theta-\phi_2-90°+\phi_3$. It should be noted that since rotator 133 is applied both between birefringent fibers 134 and 132, and between birefringent fibers 164 and 162, the following constraint upon angles $\phi_2$, $\phi_3$, and $\phi_4$ applies:

$$\phi_2 = \phi_4 - \phi_3$$

It should be noted that in the general case, as long as the rotators 113, 130 and 123 are set to cause rotations as outlined above, each of angles $\phi_2$, $\phi_3$, and $\phi_4$ could be any angle subject only to the this constraint. In fact, angles $\phi_2$, $\phi_3$, and $\phi_4$, could be such that rotators 113, 130, and 123 should be set to rotate polarization states by 0° which would be the case for example if $\phi_2$ were equal to θ, if $\phi_3$ were equal to 90°, and if $\phi_4$ were equal to θ+90°.

In this embodiment, preferably the offset 140 and inverter 150, of FIG. 8 will be dispensed with in favor of a separate control for each of the rotators 133, and 163.

Although the preferred embodiments utilize only two stages wherein each stage only utilizes two birefringent elements, in general any number pairs of stages employing any number of ordered paired orthogonal birefringent elements having corresponding NGDs may be used. For example, pairs of additional stages similar to the first and second stages 110 and 120 of FIG. 2 may be employed for additional second order PMD compensation. An example use of additional pairs of stages is when both coarse and fine tuning is required. If the embodiment depicted in FIG. 6 was such that the angle between wave-plates was controlled coarsely by mechanical rotators 125 and 127 to obtain a coarse amount of second order PMD compensation, an additional pair of stages identical to the first and second stage could be added and tuned to a relatively small angle ψ by finely tunable mechanical rotators (perhaps even with a limited range of rotation). The total first order PMD compensation would still be zero, however, the second order PMD compensation of the two pairs of stages would be:

$$2DGD^2 \sin(2\theta) + 2DGD^2 \sin(2\psi) ps^2$$

It is also possible that additional pairs of stages utilize different birefringent elements than that used by the first pair of stages. If the second pair of stages uses wave-plates with different DGDs than the first pair of stages the second order PMD compensation of the two pairs of stages would be:

$$2DGD_1^2 \sin(2\theta) + 2DGD_2^2 \sin(2\psi) ps^2$$

Where $DGD_1$ is the DGD of the wave-plates of the first pair of stages, and $DGD_2$ is the DGD of the wave-plates of the second pair of stages. If the DGD of the second pair of stages is small, this provides even finer tuning capability. In general, since the second order PMD compensation is determined by the presence of each pair of corresponding stages, as long as the stages of each pair is present, the stages themselves may be arranged in any order.

It also is possible for each stage of a pair of stages to have any number of birefringent elements greater than two as long as the corresponding stage of the pair has the same number of birefringent elements, each element of a stage arranged orthogonal to its corresponding element of the other stage. An example is when a pair of stages has an odd number of wave-plates such as three or five. Such a pair of stages is more complicated in that there would be additional degrees of freedom. Tuning would be more complicated in that more control would be required to exploit the full range of angles of all the wave-plates. In practice, to implement any type of pair of stages using more than two wave-plates, and hence having more degrees of freedom, a designer preferably would perform an eigen-analysis of the Jones matrix for pair of stages. The resulting expression for second order PMD compensation will allow control of the degrees of freedom with a predictable resulting second order PMD compensation. Of course in the alternative, in the absence of any eigen-analysis, the second order PMD behavior of the pair of stages may be measured to calibrate the compensator for predictable control when put into use.

In general any number of pairs of stages may be used as long as the elements within each stage of a pair is orthogonal to a corresponding element of the second stage of the pair. To ensure second order PMD compensation, ordered sets of elements are preferred. This is when the nth birefringent element of the first of stage of a pair of stages is orthogonal to the nth birefringent element of the second stage of the pair of stages. It is, however, possible to provide a pair of stages with corresponding orthogonal elements not in the same order. In the case of stages having only two wave-plates, a pair of stages which has orthogonal elements not in the same order, will not provide any second order PMD compensation. If however the number of wave-plates in each stage is greater than two then the ordering of the plates in the stage may in practice create some second order PMD compensation which may be determined from an eigen-analysis of the Jones Matrix of the pair of stages, or which may be determined from experiment.

Figure 9:
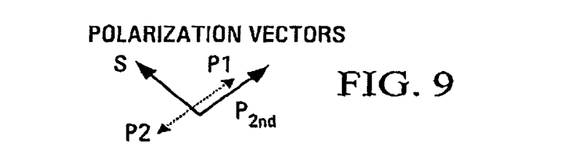
FIG. 9 is a vector diagram in Stokes space of the polarization vectors of an incoming optical signal and a second order PMD block of a tunable dispersion compensator (TDC)
Figure 10:
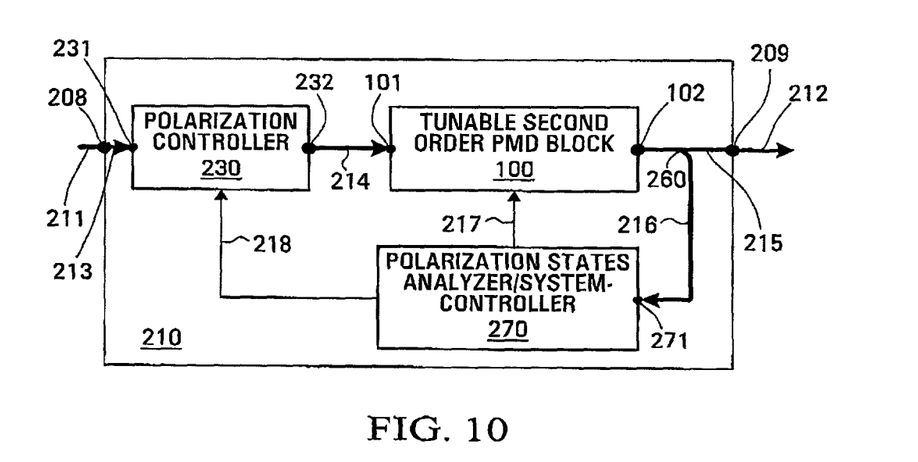
FIG. 10 is block diagram of a preferred embodiment of a tunable dispersion compensator constructed according to the invention.

Referring to both FIGS. 9 and 10, a tunable dispersion compensator (TDC) according to a preferred embodiment of the invention is described. As was described above, second order PMD is characterized by dispersion which varies parabolically with ω and hence is very similar to standard chromatic dispersion. A tunable compensator uses the ability to tune the second order polarization mode dispersion compensation of a second order PMD block to compensate for chromatic dispersion in a single polarization stare optical signal which has not undergone polarization mode dispersion.

FIG. 9 which conceptually depicts polarization vectors in Stokes space will be referred to in the following discussion of the embodiment depicted in FIG. 10. Vector S represents the incoming optical signal polarization state of the single polarization state input optical signal which has not undergone PMD. Vector $P_{2nd}$ represents the second order PMD of a tunable second order PMD block 100 of the tunable dispersion compensator 210, while P1 and P2 represent the eigenvectors of the second order characteristic matrix $N_2$ of the PMD created by the tunable second order PMD block 100. By convention, the second order PMD vector of the tunable second order PMD block 100 $P_{2nd}$ will point in the direction of either P1 or P2 whichever one in which positive dispersion occurs.

The tunable dispersion compensator (TDC) 210 has an optical input 208 connected to an input fiber 211. The optical input 208 is connected via an optical waveguide portion 213 to an input 231 of a polarization controller 230. The polarization controller 230 has an output 232 which is connected via an optical waveguide portion 214 to an input 101 of a tunable second order PMD block 100. The tunable second order PMD block 100 has an output 102 which is connected via an optical waveguide portion 215 to an output 209 of the tunable dispersion compensator 210. The output 209 of the tunable dispersion compensator 210 is connected to an output fiber 212. A waveguide power tap 260 is coupled along waveguide portion 215. The waveguide power tap 260 is connected via optical waveguide portion 216 to an input 271 of a polarization states analyzer/system-controller 270. The polarization states analyzer/system-controller 270 is coupled along PMD block control line(s) 217 to the tunable second order PMD block 100 and is coupled along polarization controller control line(s) 218 to the polarization controller 230.

In terms of function, an input optical signal traversing input fiber 211 enters the input 208 of the tunable dispersion compensator 210. The input optical signal is assumed to be a single polarization state optical signal which has not undergone any polarization mode dispersion. The signal traverses optical waveguide portion 213 and enters the input 231 of the polarization controller 230. The polarization controller 230, controlled by the polarization states analyzer/system-controller 270 via polarization controller control line(s) 218, controls the polarization states of the incoming optical signal. Specifically the polarization controller 230 rotates the Stokes vector S of the input signal, shown in FIG. 9, to match a direction opposite from the second order polarization mode dispersion vector $P_{2nd}$ of the tunable second order PMD block 100. To further facilitate this matching of direction, the polarization mode dispersion vector $P_{2nd}$ may be flipped to its negative by setting the tunable second order PMD block 100 to a negative angle θ as described above. The optical signal emerges from the output 232 of the polarization controller 230 and traverses the optical waveguide portion 214 to the input 101 of the tunable second order PMD block 100. The tunable second order PMD block 100 presents a zero first order polarization mode dispersion, but a variable chromatic like second order polarization mode dispersion (at a given direction) to the optical signal. Since the polarization controller 230 rotated the single principal polarization state of the input optical signal to match the direction opposite to the second order PMD of the second order PMD block 100, the positive standard chromatic dispersion is compensated by a corresponding negative chromatic-like second order polarization mode dispersion of the second order PMD block 100. The magnitude of the compensation is tuned by varying the angle θ of the second order PMD block 100, as described above. A compensated optical signal emerges from output 102 of the tunable second order PMD block 100 onto an optical waveguide portion 215. Part of the compensated optical signal is tapped by the waveguide power tap 260, and traverses the waveguide portion 216 to the input 71 of the polarization states analyzer/system controller 270. Part of the compensated optical signal continues along the optical waveguide portion 215 to emerge from output 209 of the tunable dispersion compensator 210 onto the output fiber 212. The optical signal input through input 271 of the polarization states analyzer/system controller 270 is used to determine if the polarization controller 230, or the tunable second order PMD block 100 needs to be controlled or varied in order to effect proper standard chromatic dispersion compensation. Specifically, as described above, the direction of the principal polarization states Stokes vector of the input optical signal is varied by the polarization controller 230 via control signals sent by the polarization states analyzer/system controller 270 over polarization controller control line(s) 218, to rotate the Stokes vector to be in the opposite direction in Stokes space to the second order polarization mode dispersion Stokes vector of the tunable second order PMD block 100. The amount of chromatic dispersion of the tunable second order PMD block 100 is controlled via control signals sent by the polarization states analyzer/system controller 270 over PMD block control line(s) 217. The control signals serve to cause a rotation of optical elements or the optical signals themselves inside the tunable second order PMD block 100, to effect the proper magnitude of second order polarization mode dispersion so that chromatic dispersion compensation of a desired magnitude results. Not shown in the figure is a standard dispersion compensation module (DCM) which may be added for example along waveguide portion 215 to shift the range of tunable dispersion of the TDC 210. For example, given a tunable second order PMD block 100 having a tuning range of −x/2 to x/2 chromatic dispersion compensation, the TDC 210 may be set to have a range of 0 to x chromatic dispersion compensation by adding a fixed DCM of x/2 chromatic dispersion compensation.

Figure 11:
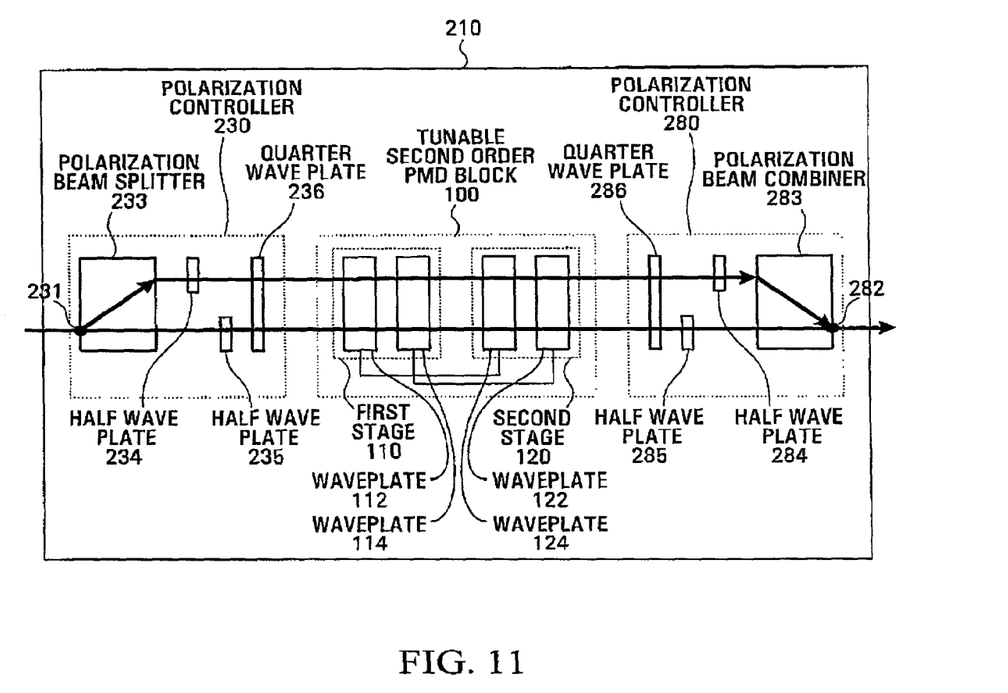
FIG. 11 is block diagram of a tunable second order PMD block and associated polarization controllers in an alternative embodiment of the tunable dispersion compensator of FIG. 10.

FIG. 11 illustrates an example embodiment of the invention which is an implementation of an alternative of the tunable dispersion compensation module of FIG. 10. The tunable second order PMD block 100 is the same as the tunable second order PMD block of FIG. 6. The polarization controller 230 in this embodiment is also a beam splitter, wherein each beam provided to the tunable second order PMD block 100 is oriented along a direction in Stokes space, opposite to the direction of the second order PMD of the tunable second order PMD block, as was described in association with FIG. 10. A second polarization controller 280, not shown in FIG. 10 is provided in this embodiment to combine beams split by the polarization controller 230.

An input optical signal having a single principle state of polarization and which has nor undergone any PMD is input through an input 231 of the polarization controller 230. The optical signal then traverses polarization beam splitter 233 which could be for example a Rutile crystal, emerging as, at most, two beams having orthogonal linear polarization states. If the input beam is linearly polarized and aligned perfectly with the splitters fast axis it is theoretically possible that only a single beam will emerge, but this does not change the operation of the tunable dispersion compensator.

A first beam emerging from the polarization beam splitter 233 passes through a first half wave-plate 234 whose fast axis is oriented at 22.5 degrees from the direction of polarization of the first beam. A second beam emerging from the polarization beam splitter 233, which is polarized orthogonal to the first beam, passes through a second half wave-plate 235 whose fast axis is oriented at 67.5 degrees from the direction of polarization of the first beam. Since the polarization states of the first and the second beams are orthogonal, and since the half-wave plates "rotate" polarization states by reflecting the direction of polarization of optical signals about their fast axes, both beams emerging from the half wave-plates will be polarized in a direction 45 degrees from the polarization of the first beam emerging from polarization beam splitter 233 regardless of the original orientation of the polarization state S of the input optical signal. Each beam then passes through a first quarter wave-plate 236, whose fast axis is oriented either along a direction coinciding with the direction of polarization of the first or second beam emerging from polarization beam splitter 233. This will cause the beams emerging from the first quarter wave plate 236 to respectively be right or left circularly polarized. In this way the direction of the Stokes vector of the polarization state of the input optical signal is set to be opposite to the second order PMD Stokes vector of the tunable second order PMD block 100. The tunable second order PMD block 100 functions the same as that described in association with FIG. 6, with the exception of having two input beams, which have the same input polarization vector in Stokes space, aligned with the direction which coincides with the negative dispersion provided by the tunable second order PMD block 100. Two beams emerging from the tunable second order PMD block 100 pass through the second polarization controller 280, passing firstly through a second quarter wave-plate 286 which changes the circular polarization of the beams back to a linear polarization. Preferably the components of the second order polarization controller 280, are at 90 degree angles to corresponding components of the first polarization controller to ensure no first order PMD through the combined effect of the first and second polarization controllers. The second quarter wave-plate 286 changes the circular polarization of the beams passing therethrough into linear polarizations along a common direction. Half-wave plates 284 and 285 rotate the polarization states of the beams so that they are orthogonal to each other. Polarization combiner 283 combines the orthogonal beams input thereto in an inverse manner as that applied by the polarization beam splitter 233 to output a single polarization state, chromatic dispersion compensated output optical signal from an output 282. Although not shown in FIG. 11, various control lines for controlling the elements of the polarization controllers 230 and 280, and for controlling the tunable second order PMD block 100 are employed in accordance with FIG. 10, as well as the polarization states analyzer/system controller 270.

Although in this implementation specific angles and directions of polarization have been referred to, in general any set of components comprising a polarization controller which is capable of rotating the Stokes vector of the input signal to match the direction in Stokes space in which the tunable second order PMD block provides negative chromatic dispersion, may be used.

As a concrete example of the tunable dispersion compensation provided by an embodiment as depicted in FIGS. 9, 10 and 11 of a tunable dispersion compensator, if the wave-plates 112, 114, 122, and 124 all have 20 ps delay between their fast and slow axis, this tunable dispersion compensator 210 has a tunable dispersion range from about −155 ps/nm to 155 ps/nm.

Numerous modifications and variations of the present invention are possible in light of the above teachings. It is therefore to be understood that within the scope of the appended claims, the invention may be practised otherwise than as specifically described herein.

The invention claimed is:

1. A method of providing dispersion compensation to an optical signal having a direction of propagation, the method comprising in order:

passing the optical signal through a first birefringent element having a fast axis and a slow axis in a normal plane oriented normal to the direction of propagation, the fast axis oriented in a first direction in the normal plane;

passing the optical signal through a second birefringent element having a second fast axis oriented in a second direction in the normal plane, the second direction being at a nonzero angle from θ the first direction;

passing the optical signal through a third birefringent element having a third fast axis oriented in a third direction in the normal plane, the third direction being orthogonal to the first direction; and passing the optical signal through a fourth birefringent element having a fourth fast axis oriented in a fourth direction in the normal plane, the fourth direction being orthogonal to the second direction wherein passing the optical signal though the first, second, third and fourth birefringent elements results in compensation of second order polarization mode dispersion but leaves first order polarization mode dispersion substantially uncompensated.

2. The method of claim 1 further comprising the step of controlling the polarization of the optical signal such that a Stokes vector of a second order polarization of the optical signal is of equal magnitude and opposite direction to a Stokes vector of a second order polarization mode dispersion of the combination of the first, second, third and fourth birefringent elements.

3. An apparatus for providing dispersion compensation to an optical signal having a direction of propagation, the apparatus comprising;

a first birefringent element having a fast axis and a slow axis in a normal plane oriented normal to the direction of propagation, the fast axis oriented in a first direction in the normal plane;

a second birefringent element having a second fast axis oriented in a second direction in the normal plane, the second direction being at a nonzero angle θ from the first direction;

a third birefringent element having a third fast axis oriented in a third direction in the normal plane, the third direction being orthogonal to the first direction; and a fourth birefringent element having a fourth fast axis oriented in a fourth direction in the normal plane, the fourth direction being orthogonal to the second direction;

wherein the first, second, third, and fourth birefringent elements are arranged for the passing of the optical signal through, in order, the first birefringent element, the second birefringent element, the third birefringent element, and the fourth birefringent element, and wherein passing the optical signal though the first, second, third and fourth birefringent elements results in compensation of second order polarization mode dispersion but leaves first order polarization mode dispersion substantially uncompensated.

4. An apparatus according to claim 3 further comprising:
a polarization controller for controlling the polarization of the optical signal before it passes through the first birefringent element, such that a second order PMD Stokes vector of the optical signal is opposite to the direction of the Stokes vector of second order PMD caused by the first, second, third, and fourth birefringent elements;
whereby second order PMD compensation is provided to the optical signal and an insignificant amount of first order PMD compensation is provided to the optical signal.

5. An apparatus according to claim 4 wherein the first, second, third, and fourth birefringent elements are wave-plates.

6. The apparatus of claim 5 wherein the differential group delay of each of the wave-plates is substantially equal.

7. An apparatus according to claim 4 wherein the first, second, third, and fourth birefringent elements are birefringent fibers.

8. An apparatus according to claim 4 further comprising:
a birefringent element controller for controlling the nonzero angle $\theta$ through mechanical rotation of the first and third birefringent elements;
whereby the magnitude of the second order PMD compensation is controlled.

9. An apparatus according to claim 8 further comprising:
an optical signal analyzer for analyzing the optical signal after it has passed through the fourth birefringent element producing an analysis of the optical signal;
wherein the polarization controller controls the polarization of the optical signal and the birefringent element controller controls the nonzero angle $\theta$ as a function of the analysis of the optical signal.

10. An apparatus according to claim 4 further comprising:
a birefringent element controller for controlling the nonzero angle $\theta$ through mechanical rotation of the second and fourth birefringent elements;
whereby the magnitude of the second order PMD compensation is controlled.

11. An apparatus according to claim 10 further comprising:
an optical signal analyzer for analyzing the optical signal after it has passed through the fourth birefringent element producing an analysis of the optical signal;
wherein the polarization controller controls the polarization of the optical signal and the birefringent element controller controls the nonzero angle $\theta$ as a function of the analysis of the optical signal.

12. The apparatus of claim 4 where the first, second, third and fourth birefringent elements are configured such that the nonzero angle $\theta$ is variable.

13. The apparatus of claim 12 wherein the nonzero angle $\theta$ is varied to provide second order polarization mode dispersion compensation.

14. An apparatus according to claim 3 further comprising:
a polarization controller for controlling the polarization of the optical signal before it passes through the first birefringent element, such that the principal polarization state Stokes vector of the optical signal is opposite to the direction of the Stokes vector of second order PMD caused by the first, second, third, and fourth birefringent elements;
whereby chromatic dispersion compensation is provided to the optical signal and an insignificant amount of first order PMD compensation is provided to the optical signal.

15. An apparatus according to claim 14 wherein the first, second, third, and fourth birefringent elements are wave-plates.

16. An apparatus according to claim 14 wherein the first, second, third, and fourth birefringent elements are birefringent fibers.

17. An apparatus according to claim 14 further comprising:
a birefringent element controller for controlling the nonzero angle $\theta$ through mechanical rotation of the first and third birefringent elements;
whereby the magnitude of the chromatic dispersion compensation is controlled.

18. An apparatus according to claim 17 further comprising:
an optical signal analyzer for analyzing the optical signal after it has passed through the fourth birefringent element producing an analysis of the optical signal;
wherein the polarization controller controls the polarization of the optical signal and the birefringent element controller controls the nonzero angle $\theta$ as a function of the analysis of the optical signal.

19. An apparatus according to claim 14 further comprising:
a birefringent element controller for controlling the nonzero angle $\theta$ through mechanical rotation of the second and fourth birefringent elements;
whereby the magnitude of the chromatic dispersion compensation is controlled.

20. An apparatus according to claim 19 further comprising:
an optical signal analyzer for analyzing the optical signal after it has passed through the fourth birefringent element producing an analysis of the optical signal;
wherein the polarization controller controls the polarization of the optical signal and the birefringent element controller controls the nonzero angle $\theta$ as a function of the analysis of the optical signal.

21. A method of providing second order PMD compensation to an optical signal, the method comprising:
passing the optical signal through a tunable second order PMD block;
analyzing the optical signal after it has passed through the tunable second order PMD block producing an analysis of the optical signal;
controlling the polarization of the optical signal as a function of the analysis of the optical signal such that a second order PMD Stokes vector of the optical signal is opposite to the direction of the Stokes vector of second order PMD caused by the tunable second order PMD block; and
controlling the magnitude of the second order PMD caused by the tunable second order PMD block as a function of the analysis of the optical signal;
whereby second order PMD compensation is provided to the optical signal and an insignificant amount of first order PMD compensation is provided to the optical signal.

22. A method of providing chromatic dispersion compensation to an optical signal, the method comprising:
passing the optical signal through a tunable second order PMD block;
analyzing the optical signal after it has passed through the tunable second order PMD block producing an analysis of the optical signal;

controlling the polarization of the optical signal as a function of the analysis of the optical signal such that the principal polarization state Stokes vector of the optical signal is opposite to the direction of the Stokes vector of second order PMD caused by the tunable second order PMD block; and controlling the magnitude of the second order PMD caused by the tunable second order PMD block as a function of the analysis of the optical signal;

whereby chromatic dispersion compensation is provided to the optical signal and an insignificant amount of first order PMD compensation is provided to the optical signal.

23. An tunable PMD compensation block for providing second order polarization mode dispersion compensation to an optical signal having a direction of propagation, the tunable PMD compensation block comprising:

a first stage having a first order polarization mode dispersion Stokes vector in a first direction with a first magnitude;

a second stage having a first order polarization mode dispersion Stokes vector in a second direction opposite to the first direction and a second magnitude equal to the first magnitude.

24. The tunable PMD compensation block of claim 23 wherein the first stage of the tunable second order PMD block comprises first birefringent element having a fast axis and a slow axis in a normal plane oriented normal to the direction of propagation, the fast axis oriented in a first direction in the normal plane and a second birefringent element having a second fast axis oriented in a second direction in the normal plane, the second direction being at a nonzero angle θ from the first direction, and the second stage of the tunable PMD compensation block comprises a third birefringent element having a third fast axis oriented in a third direction in the normal plane, the third direction being orthogonal to the first direction and a fourth birefringent element having a fourth fast axis oriented in a fourth direction in the normal plane, the fourth direction being orthogonal to the second direction.

25. The tunable PMD compensation block of claim 24 wherein the first, second, third and fourth birefringent elements are wave-plates.

* * * * *